United States Patent
Lee et al.

(10) Patent No.: US 10,978,749 B2
(45) Date of Patent: Apr. 13, 2021

(54) METHOD FOR INJECTING ELECTROLYTE TO POUCH SECONDARY BATTERY USING GAP-CONTROLLING JIG

(71) Applicant: LG CHEM, LTD., Seoul (KR)

(72) Inventors: Byeong-Kyu Lee, Daejeon (KR); Kyung-Jae Lee, Daejeon (KR); Su-Taek Jung, Daejeon (KR); Min-Cheol Choi, Daejeon (KR); Cha-Hun Ku, Daejeon (KR)

(73) Assignee: LG Chem, Ltd.

( * ) Notice: Subject to any disclaimer, the term of this patent is extended or adjusted under 35 U.S.C. 154(b) by 164 days.

(21) Appl. No.: 16/095,882

(22) PCT Filed: Dec. 11, 2017

(86) PCT No.: PCT/KR2017/014472
§ 371 (c)(1),
(2) Date: Oct. 23, 2018

(87) PCT Pub. No.: WO2018/110919
PCT Pub. Date: Jun. 21, 2018

(65) Prior Publication Data
US 2019/0131666 A1    May 2, 2019

(30) Foreign Application Priority Data

Dec. 15, 2016  (KR) .................. 10-2016-0171928
Dec. 8, 2017   (KR) .................. 10-2017-0168534

(51) Int. Cl.
*H01M 10/42*   (2006.01)
*H01M 2/36*    (2006.01)
(Continued)

(52) U.S. Cl.
CPC ......... *H01M 10/4235* (2013.01); *H01M 2/02* (2013.01); *H01M 2/021* (2013.01);
(Continued)

(58) Field of Classification Search
CPC .......... H01M 10/052; H01M 10/4214; H01M 10/4235; H01M 2220/30; H01M 2/02;
(Continued)

(56) References Cited

U.S. PATENT DOCUMENTS

2013/0061461 A1* 3/2013 Shimura ............... H01G 9/155
29/623.5

FOREIGN PATENT DOCUMENTS

| CN | 201008005 Y  | 1/2008  |
| CN | 103137997 A  | 6/2013  |
| JP | 2002-298833 A | 10/2002 |
| JP | 2009-181862 A | 8/2009  |
| JP | 2011-060564 A | 3/2011  |

(Continued)

OTHER PUBLICATIONS

Supplementary European Search Report corresponding to European Patent Application No. 17880635.2, dated May 6, 2019, 6 pages.

(Continued)

*Primary Examiner* — Adam A Arciero
(74) *Attorney, Agent, or Firm* — Lerner, David, Littenberg, Krumholz & Mentlik, LLP

(57) ABSTRACT

The present disclosure relates to a method for injecting an electrolyte to a pouch secondary battery which includes the steps of: interposing an electrode assembly between a first metal laminate film and a second metal laminate film forming a pouch casing, and sealing the edges of each of the films with an electrolyte inlet left therein, thereby providing a pouch secondary battery; mounting the pouch secondary battery between a first jig and a second jig, which are installed in a jig stand so as to have a controllable interval and form a gap space, with the electrolyte inlet facing up, and injecting an electrolyte through the electrolyte inlet; loading the jig stand to a vacuum chamber; increasing the width of the gap space by moving the first and the second jigs so that the area occupied by the electrolyte may be localized in the lower part of the pouch casing, and then (Continued)

forming vacuum atmosphere; and moving the first and the second jigs while maintaining the vacuum atmosphere so that the width of the gap space may be reduced gradually and the liquid surface of the electrolyte may be lifted gradually to a position higher than the top of the electrode assembly.

11 Claims, 7 Drawing Sheets

(51) Int. Cl.
  *H01M 2/02* (2006.01)
  *H01M 10/052* (2010.01)
(52) U.S. Cl.
  CPC ......... *H01M 2/0212* (2013.01); *H01M 2/361* (2013.01); *H01M 2/365* (2013.01); *H01M 10/052* (2013.01); *H01M 10/4214* (2013.01); *H01M 2220/30* (2013.01)
(58) Field of Classification Search
  CPC .... H01M 2/021; H01M 2/0212; H01M 2/361; H01M 2/365
  See application file for complete search history.

(56) References Cited

FOREIGN PATENT DOCUMENTS

| JP | 2012-142099 A | 7/2012 |
| JP | 2013-030353 A | 2/2013 |
| JP | 5151755 B2 | 2/2013 |
| JP | 5187733 B2 | 4/2013 |
| JP | 2013-229571 A | 11/2013 |
| JP | 2016-046178 A | 4/2016 |
| KR | 10-2011-0133927 A | 12/2011 |
| KR | 10-1306187 B1 | 9/2013 |
| KR | 20150015387 A | 2/2015 |
| KR | 20150095387 A | 8/2015 |
| KR | 10-2015-0103922 A | 9/2015 |
| KR | 10-2016-0086196 A | 7/2016 |
| KR | 10-2016-0107644 A | 9/2016 |

OTHER PUBLICATIONS

International Search Report for PCT/KR2017/014472 (PCT/ISA/210) dated Apr. 11, 2018.
Search Report from First Chinese Office Action for Application No. 201780039577.5 dated Jan. 5, 2021; 3 pages.

* cited by examiner

METHOD FOR INJECTING ELECTROLYTE TO POUCH SECONDARY BATTERY USING GAP-CONTROLLING JIG

TECHNICAL FIELD

The present disclosure relates to a method for injecting an electrolyte to a pouch secondary battery. More particularly, the present disclosure relates to a method for injecting an electrolyte which includes controlling the level of a liquid surface upon the injection of an electrolyte to a pouch secondary battery to reduce the tack time of a liquid injection step and to improve productivity.

The present application claims priority to Korean Patent Application No. 10-2016-0171928 filed on Dec. 15, 2016 and Korean Patent Application No. 10-2017-0168534 filed on Dec. 8, 2017 in the Republic of Korea, the disclosures of which are incorporated herein by reference.

BACKGROUND ART

As technological development and demand for mobile instruments have been increased, batteries as energy sources for such mobile instruments are increasingly in demand. Therefore, many studies have been conducted about batteries which can meet various needs.

In terms of the shape of a battery, prismatic secondary batteries and pouch type secondary batteries which have a small thickness and can be applied to products, such as cellular phones, are in high demand.

In terms of a material, lithium secondary batteries, such as lithium-ion batteries and lithium-ion polymer batteries, which have high energy density, discharge voltage and output stability, are in high demand.

Recently, a pouch secondary battery provided with a structure in which a stack-type or stack/folded electrode assembly is received in a pouch casing including a metal (Al) laminate film has been given many attentions as a lithium secondary battery and use thereof has been increased gradually, since it requires low manufacturing cost, has a low weight and is easily deformable.

As generally known in the art, a pouch secondary battery is manufactured through the following process. First, electrode plates and porous insulating separators are stacked to form an electrode assembly. The separator is interposed between a positive electrode plate and a negative electrode plate.

Each of the positive electrode plate and negative electrode plate is coated with an active material. Typical examples of the positive electrode active material and the negative electrode active material include lithium metal oxide and graphite, respectively.

Each electrode plate has a protruding and extended electrode tab, and the electrode tab is connected to an electrode lead. The electrode assembly to which the electrode lead is connected is placed between two sheets of metal laminate films. Herein, such two sheets of metal laminate films form a pouch casing. The edges of the metal laminate films are sealed with an electrolyte inlet left therein. Then, an electrolyte is injected through the electrolyte inlet and the electrolyte inlet is sealed so that the electrode assembly may be sealed in the pouch casing.

A conventional process for injecting an electrolyte includes a pre-process of injecting an electrolyte to a pouch casing, and a post-process of loading the pouch casing having the electrolyte injected thereto to a vacuum chamber and removing the gases present in the electrode assembly. Herein, the gases originate from the air remaining in the inner space of the pouch casing and the fine gap present in the electrode assembly, when the electrolyte is injected to the pouch casing.

In the post-process, a high degree of vacuum is required to remove the gases effectively. However, when a high degree of vacuum is set from the initial stage, the electrolyte may be ejected to the outside through the electrolyte inlet while the gases are emitted rapidly.

Such ejection of an electrolyte contaminates the surface of the pouch casing. Therefore, when carrying out the post-process, the vacuum degree of the vacuum chamber is increased by multiple stages. As such, the tack time of the process is increased.

Meanwhile, there is a limitation in removing the gases in the pouch casing rapidly when using the post-process alone. Therefore, a pre-vacuum post-injection process which includes removing the gases in the pouch casing preliminarily under vacuum atmosphere is used, before injecting the electrolyte.

However, the pre-vacuum post-injection process requires a time during which vacuum atmosphere is formed, before injecting the electrolyte, and thus still causes an increase in the tack time of the process. In addition, when injecting the electrolyte to the pouch casing under the vacuum atmosphere, there is an additional problem in that the electrolyte evaporates. Further, it is inevitable to modify a liquid injection system significantly, since a vacuum chamber and a depressurization device are further added into a system for injecting an electrolyte.

DISCLOSURE

Technical Problem

The present disclosure is designed to solve the problems of the related art, and therefore the present disclosure is directed to providing a method for injecting an electrolyte which reduces the tack time of a process for injecting an electrolyte to a pouch secondary battery and allows easy removal of gases from the inside of a pouch casing.

Technical Solution

In one aspect of the present disclosure, there is provided a method for injecting an electrolyte to a pouch secondary battery which includes the steps of: 1) interposing an electrode assembly between a first metal laminate film and a second metal laminate film forming a pouch casing, and sealing the edges of each of the films with an electrolyte inlet left therein, thereby providing a pouch secondary battery; 2) mounting the pouch secondary battery between a first jig and a second jig, which are installed in a jig stand so as to have a controllable interval and form a gap space, with the electrolyte inlet facing up, and injecting an electrolyte through the electrolyte inlet; 3) loading the jig stand to a vacuum chamber; 4) increasing the width of the gap space by moving the first and the second jigs so that the area occupied by the electrolyte may be localized in the lower part of the pouch casing, and then forming vacuum atmosphere; and 5) moving the first and the second jigs while maintaining the vacuum atmosphere so that the width of the gap space may be reduced gradually and the liquid surface of the electrolyte may be lifted gradually to a position higher than the top of the electrode assembly.

Preferably, in step 4), the liquid surface of the electrolyte may be located at a position corresponding to ½ h or less based on the height h of the electrode assembly.

The method for injecting an electrolyte according to the present disclosure may further include a step of sealing the electrolyte inlet.

Preferably, in steps 4) and 5), the same degree of vacuum may be applied to the vacuum atmosphere.

Preferably, in steps 4) and 5), the degree of vacuum of the vacuum atmosphere may be −93 kPa or less.

According to an embodiment, in step 4), the first jig and the second jig have an interval increased so that they may not pressurize the outer circumferential surface of the pouch casing substantially.

According to another embodiment, in step 5), the width of the gap space is reduced gradually at the same rate.

According to still another embodiment, in step 5), the width of the gap space is reduced gradually, wherein the reduction rate is increased gradually with time.

Optionally, according to the present disclosure, the width of the gap space may be increased while inserting a blower to the electrolyte inlet and spraying gas toward the inside of the pouch casing, in step 4).

In this case, the blower preferably sprays gas toward the side wall of the pouch casing. In addition, in step 4), the vacuum atmosphere is formed preferably after spraying gas by using the blower.

Advantageous Effects

According to the present disclosure, it is possible to remove gases from the inside of a pouch casing with ease while not causing a delay in tack time during a process for injecting an electrolyte to a pouch secondary battery. It is also possible to improve the productivity of the process for injecting an electrolyte by reducing the tack time.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

FIG. 1-FIG. 7 are schematic views illustrating the method for injecting an electrolyte to a pouch secondary battery according to an embodiment of the present disclosure.

Figure 1:
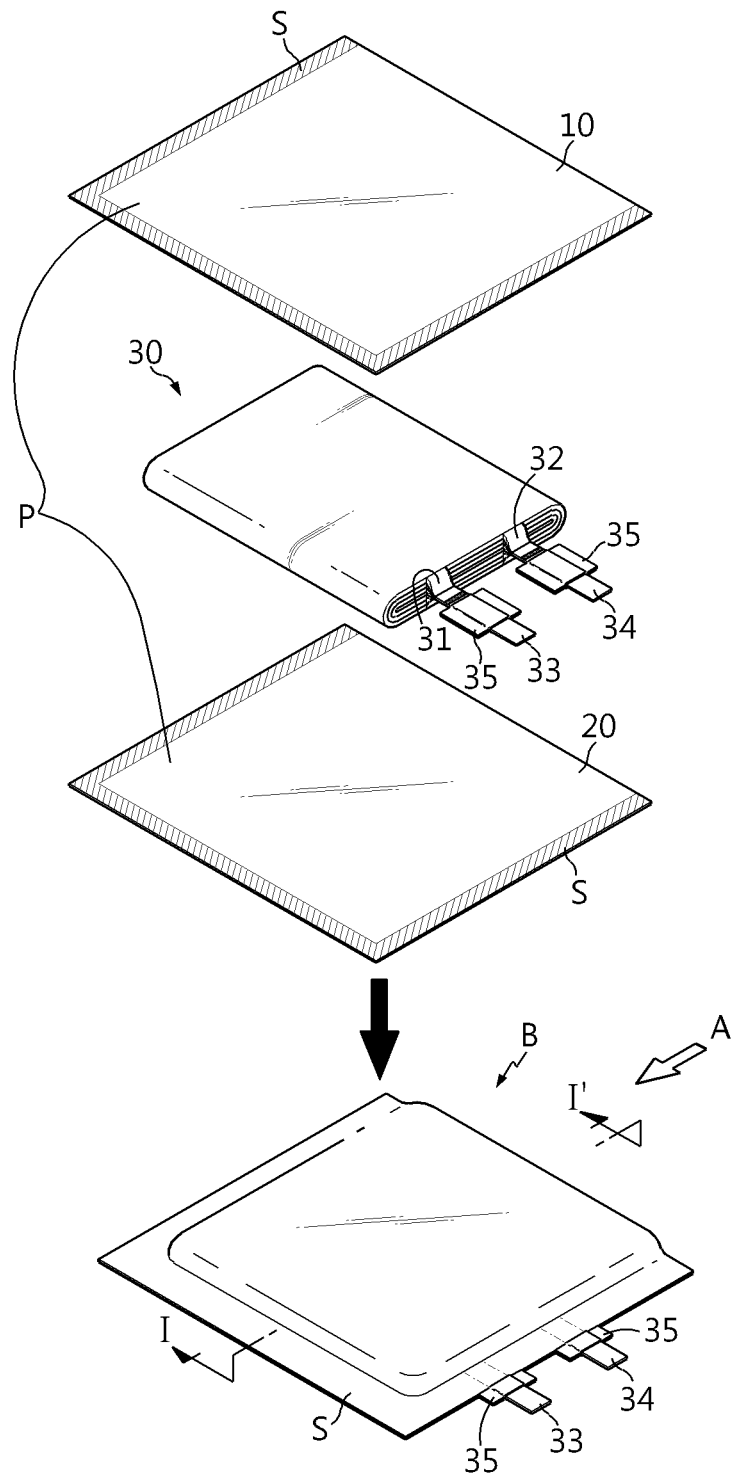
FIG. 1 is a schematic drawing illustrating the process for manufacturing a pouch secondary battery by packaging an electrode assembly with a first and a second laminate films with an electrolyte inlet left therein.

First, as shown in FIG. 1, an electrode assembly 30 is located between a first metal laminate film 10 and a second metal laminate film 20.

The first and the second metal laminate films 10, 20 form a pouch casing. Each of the first and the second metal laminate films 10, 20 has a structure in which a thin metal film (e.g., Al film) is laminated between a water-resistant polymer film (nylon) and a thermally adhesive polymer film (casted polypropylene).

The structure and ingredients of each of the first and the second metal laminate film are generally known in the art, and thus the detailed description thereof will be omitted herein.

The electrode assembly 30 includes a structure in which electrode plates and separators are stacked alternately. The electrode assembly 30 includes a plurality of unit cells including a positive electrode plate/separator/negative electrode plate.

Each electrode plate has protruding electrode tabs 31, 32. The electrode tabs are integrated and are connected with an electrode leads 33, 34. In the electrode tabs 31, 32 and the electrode leads 33, 34, one has positive polarity, and the other has negative polarity. The electrode tabs 31, 32 and the electrode leads 33, 34 are connected with each other so that the polarity of one may correspond to the polarity of the other. The connection is carried out by ultrasonic welding.

The electrode leads 33, 34 are surrounded with a sealing tape 35 at its middle portion. The sealing tape 35 is interposed between the electrode leads 33, 34 and the first and the second metal laminate films 10, 20 to improve sealability.

The edges of each of the first and the second metal laminate films 10, 20 are sealed by a hot sealing process with an electrolyte inject A left therein. In FIG. 1, the hatched region S shows the region where sealing is carried out. After sealing, the first and the second metal laminate films 10, 20 form a pouch casing P. During the sealing process, the remaining portion of the electrode assembly 30 except that the end of the electrode leads 33, 34 is surrounded with the first and the second metal laminate films 10, 20. The shape of the pouch secondary battery before injecting an electrolyte is shown at the lower part of FIG. 1.

Figure 2:
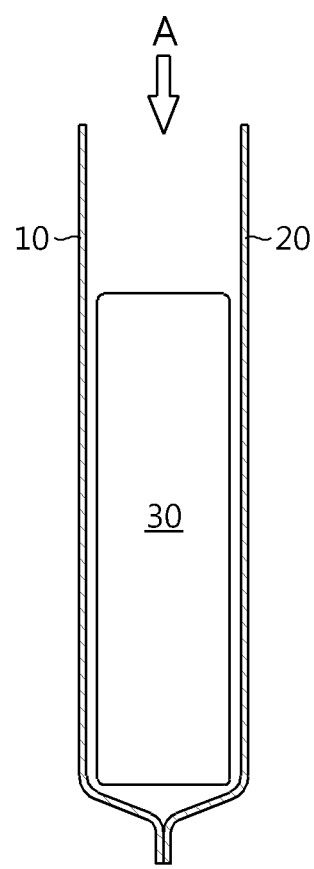
FIG. 2 is a sectional view schematically illustrating the section taken along line I-I' in the pouch secondary battery as shown in FIG. 1.

FIG. 2 is a sectional view taken along line I-I' of FIG. 1. Referring to FIG. 2, the electrolyte inlet A is opened toward the external air, since it is not sealed.

FIG. 3-FIG. 7 are schematic views illustrating a process for removing gases and sealing the electrolyte inlet in the vacuum chamber, after injecting an electrolyte into the pouch casing P through the electrolyte inlet A.

Figure 3:
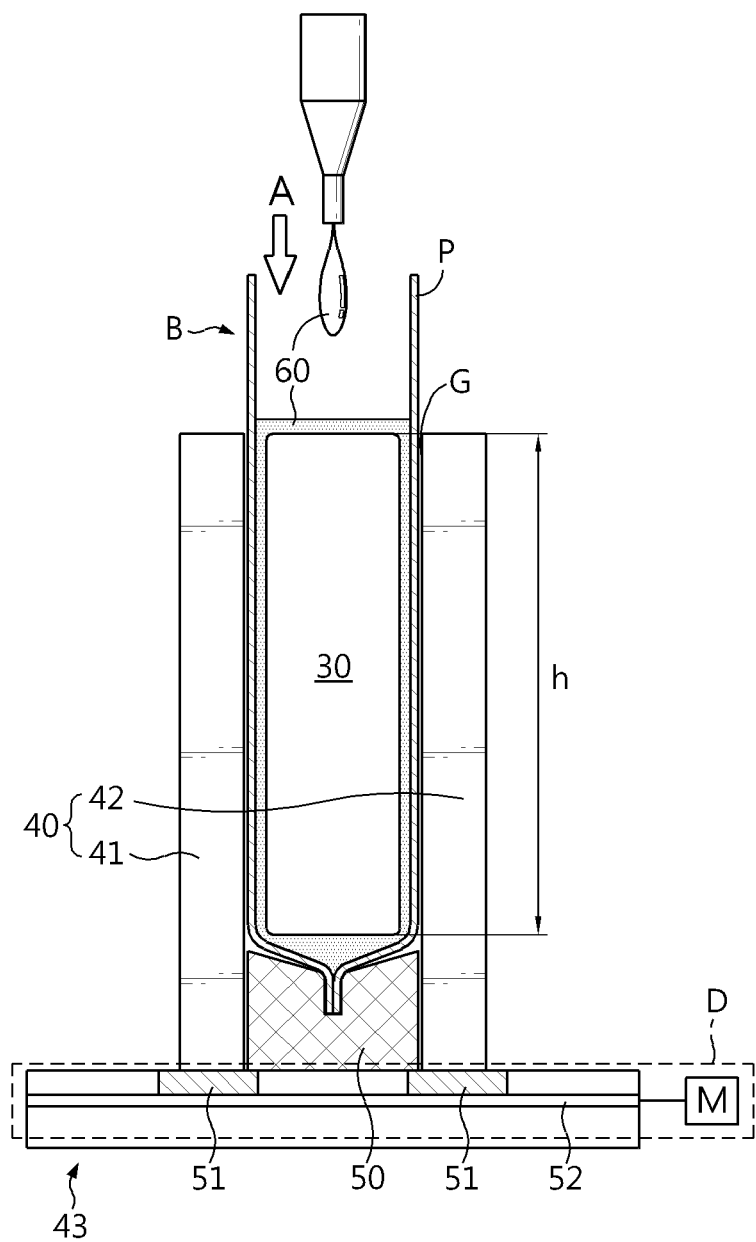
FIG. 3 is a schematic view illustrating the process for injecting an electrolyte to a pouch casing after a pouch secondary battery is located in the gap space of a gap-controlling jig.

Referring to FIG. 3, the pouch secondary battery B is located in a gap space G of a gap-controlling jig 40 provided with a first jig 41 and a second jig 42 capable of controlling a gap interval. The pouch secondary battery B is located with the electrolyte inlet facing up. The gap space G is formed between the first jig 41 and the second jig 42, and the width thereof may be controlled by moving the first jig 41 and the second jig 42 linearly. The first jig 41 and the second jig 42 may be made of a material including a metal, such as stainless steel.

The first jig 41 and the second jig 42 are installed on a jig stand 43 so that they move from side to side. The width of the gap space G may be varied through the movement of the first jig 41 and the second jig 42. For this accomplishment, the jig stand 43 may be provided with a driving mechanism D which can move the first jig 41 and the second jig 42 from side to side.

A known linear moving mechanism may be used as the driving mechanism D. For example, the driving mechanism D may include a moving block 51 to which the bottom portions of the first jig 41 and the second jig 42 are coupled, a guide rail 52 configured to receive the moving block 51 and guide the linear horizontal movement, and a linear motor M coupled to the moving block 51 to provide linear driving force.

A support member 50 is provided in the bottom of the gap space G, and the bottom portion of the pouch secondary battery B is installed to the support member in contact with each other. The portion where the support member 50 faces the pouch secondary battery B has a shape corresponding to the shape of the contact surface of the pouch secondary battery B. The pouch secondary battery B is received in and supported by the top surface of the support member 50. The support member 50 includes a metallic or plastic material.

As shown in FIG. 3, after the pouch secondary battery is received in the support member 50, the first jig 41 and the second jig 42 are allowed to be in close contact with the outer circumferential surface of the pouch secondary battery B. Then, an electrolyte 60 is injected through the electrolyte inlet A. The electrolyte 60 includes an electrolyte and an organic solvent, and the injection amount is predetermined depending on the specifications of the pouch secondary battery B.

The electrolyte 60 varies with the type of the pouch secondary battery B. When the pouch secondary battery B is a lithium secondary battery, the electrolyte may be a salt having a structure of $A^+B^-$. Herein, $A^+$ includes an alkali metal cation such as $Li^+$, $Na^+$, $K^+$ or a combination thereof.

In addition, $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Non-limiting examples of the organic solvent may include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone or a combination thereof.

Figure 4:
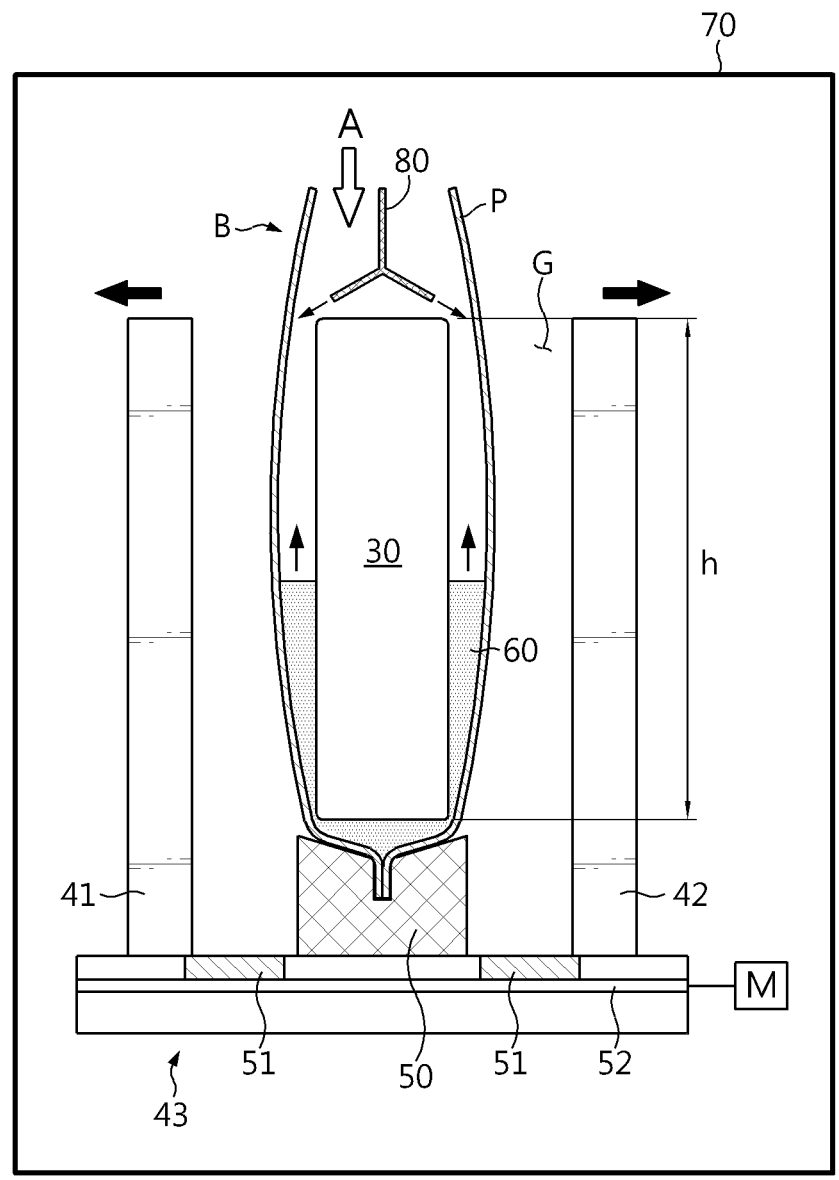
FIG. 4 is a schematic view illustrating the process which includes loading a pouch secondary battery to which an electrolyte is injected to a vacuum chamber, increasing the gap space to lower the liquid surface of the electrolyte to the maximum degree and carrying out a step of removing gases, while maintaining a high degree of vacuum.

After completing the injection of the electrolyte 60, the jig stand 43 is transported to the inside of the vacuum chamber 70 as shown in FIG. 4. Then, the first jig 41 and the second jig 42 are moved to increase the width of the gap space G. When the gap space G is increased, the liquid surface of the electrolyte 60 is lowered since the electrolyte 60 moves toward the lower part of the pouch casing P under the gravity. In other words, the region having the electrolyte 60 is localized in the lower part of the pouch casing P. In addition, since the electrolyte 60 moves toward the lower part, the lower part of the pouch casing P is also deformed into a slightly swelled shape. The increment of the gap space G is predetermined so that the movement of the electrolyte 60 toward the lower part may not be interrupted. For example, the gap space G is increased to such a degree that the gap space is not in contact with the outer circumferential surface of the pouch casing P. In another example, the gap space G is increased in such a manner that the first jig 41 and the second jig 42 apply no pressure substantially even if they are in contact with the pouch casing P. Such increment of the gap space G is accomplished by allowing the driving mechanism D to cause linear movement of the first jig 41 and the second jig 42.

The liquid surface of the electrolyte 60 is lowered preferably to ⅔ h or less, more preferably ½ h or less, based on the initial injection height h in the electrode assembly 30. Herein, the position of the liquid surface is controlled based on the region where the electrode assembly 30 is present. In the liquid surface is at ½ h, the liquid surface is located in the middle of the electrode assembly 30. Lowering the liquid surface of the electrolyte 60 to the maximum degree is more effective to remove the gases present in the electrode assembly 30.

Meanwhile, in order to lower the liquid surface of the electrolyte 60 rapidly, a blower 80 may be inserted to the electrolyte inlet 80 and inert gas (Ar) or nitrogen gas ($N_2$) may be blown into the pouch casing P, while the first jig 41 and the second jig 42 are spaced apart from each other to increase the gap space G. Preferably, the blower 80 has a Y-shaped nozzle structure and sprays gas toward the side wall of the pouch casing P. Herein, the amount of sprayed gas may be increased gradually to prevent the electrolyte 60 from being ejected at the initial stage of gas spray. The blown gas causes deformation of the shape of the pouch casing P into the shape as shown in FIG. 4 regardless of the movement of the electrolyte 60 toward the lower part. As a result, the space in which the electrolyte 60 can move toward the lower part under the gravity is ensured in advance, and thus the liquid surface of the electrolyte 60 may be lowered rapidly. The use of the blower 80 is particularly advisable when a high-viscosity electrolyte 60 is used. Such a high-viscosity electrolyte 60 requires a longer time to be moved to the lower part of the pouch casing P. When using the blower 80, depressurization for forming vacuum atmosphere inside the vacuum chamber 70 is initiated preferably after completing the gas spray using the blower 80.

When the liquid surface of the electrolyte 60 is lowered, the degree of vacuum in the vacuum chamber 70 is decreased. A preferred degree of vacuum is controlled to such a degree that the gases present in the pouch casing P and the electrode assembly 30 may be removed effectively. A particular degree of vacuum may be determined by trial and error. For example, the degree of vacuum of the vacuum chamber 70 is set to −93 kPa or less. In other words, the absolute value of the degree of vacuum is set to be larger than 93 and to have a negative value.

If the degree of vacuum of the vacuum chamber 70 is increased after the liquid surface of the electrolyte 60 is lowered, the electrode assembly 30 exposed above the top of the liquid surface of the electrolyte 60 is exposed directly to the vacuum atmosphere. Thus, the gases present in the electrode assembly are removed effectively.

In addition, fine air bubbles captured in the electrolyte 60 during the injection thereof are removed actively. Herein, since the liquid surface of the electrolyte 60 is low, it is possible to prevent the electrolyte 60 from being ejected to the outside through the electrolyte inlet A.

The time during which the degree of vacuum is maintained is set to ensure removal of the gases from the electrode assembly 30 exposed above the top of the liquid surface of the electrolyte 60 substantially. Preferably, the time during which the degree of vacuum is maintained is set to 5 minutes or more.

Figure 5:
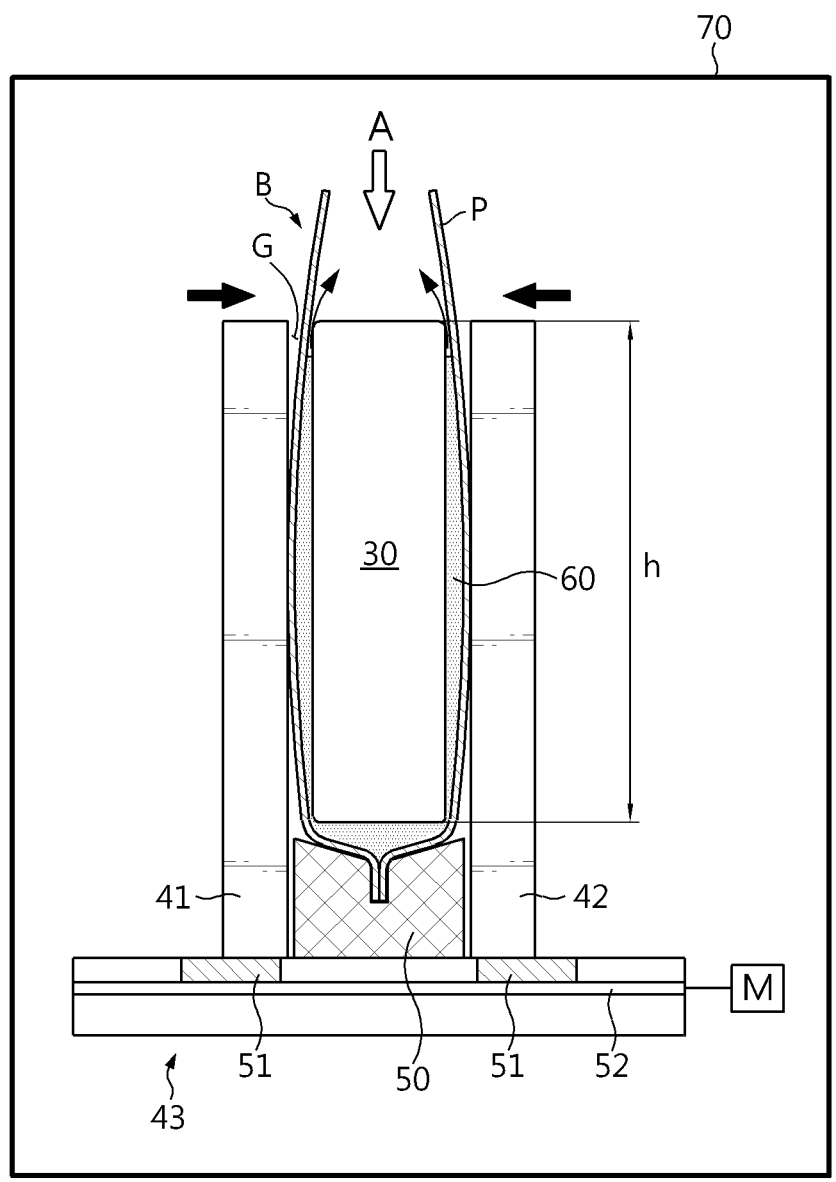
FIG. 5 is a schematic view illustrating the process for lifting the liquid surface gradually by reducing the gap space gradually while maintaining the degree of vacuum.
Figure 6:
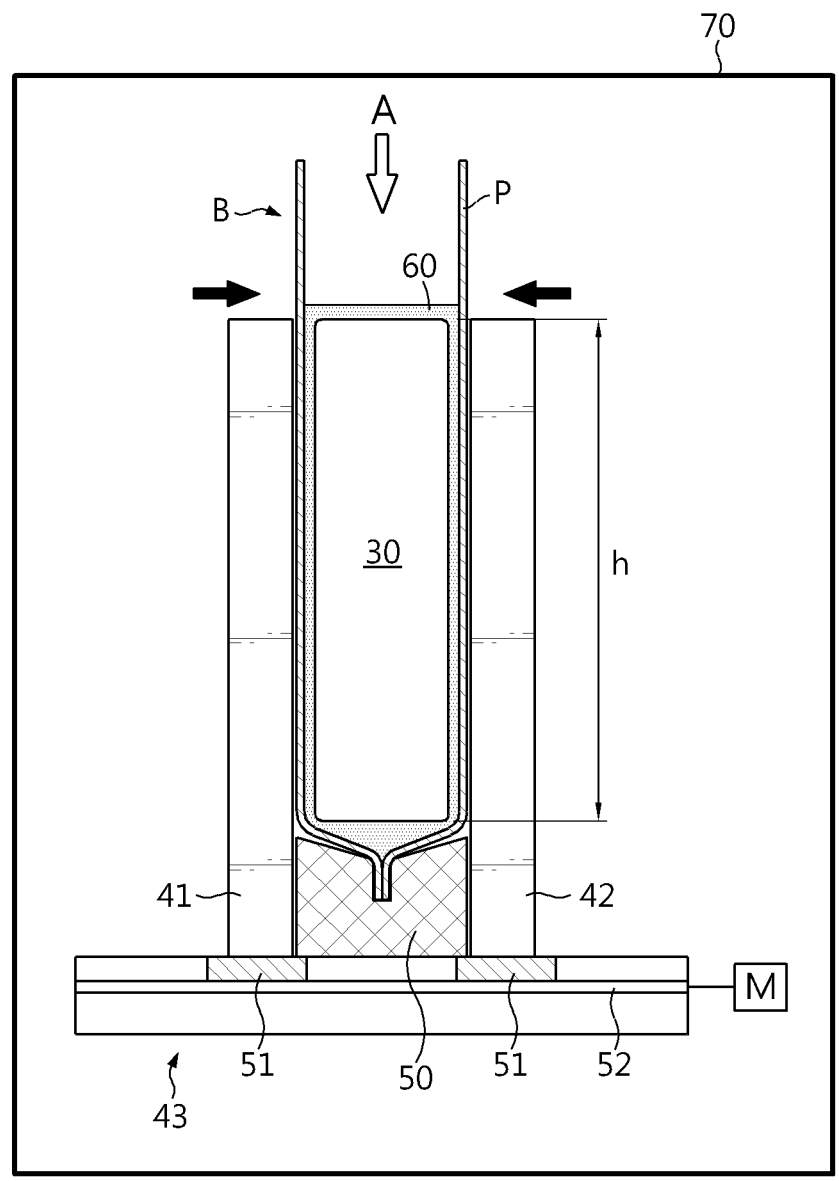
FIG. 6 is a schematic view illustrating the process for reducing the gap space so that the liquid surface of the electrolyte may be lifted to the maximum degree to the top or higher of the electrode assembly.

After that, the process as shown in FIG. 5 is carried out. In other words, after maintaining vacuum for a predetermined time while the liquid surface of the electrolyte 60 is lowered, the first jig 41 and the second jig 42 are moved again to reduce the width of the gap space G gradually. Herein, the degree of vacuum is maintained substantially the same as in the gas removing process. Then, the first jig 41 and the second jig 42 pressurize the outer circumferential surface of the pouch casing P gradually. Herein, the blower 80 is drawn out to the outside of the pouch casing P. As a result, the liquid surface of the electrolyte 60 is lifted gradually. In addition, when the position of each of the first jig 41 and the second jig 42 arrives at the position corresponding to the desired thickness of the pouch secondary battery B, the liquid surface of the electrolyte 60 is lifted to the position higher than the top of the electrode assembly, as shown in FIG. 6.

The degree of vacuum formed originally is maintained continuously while the liquid surface of the electrolyte 60 is lifted gradually. Therefore, the electrode assembly exposed above the top based on the liquid surface of the electrolyte 60 is exposed to vacuum atmosphere, and thus even a trace amount of gases present in the electrode assembly are removed totally. In addition, when the liquid surface of the electrolyte 60 is present at the lowest position, most gases are removed by the vacuum atmosphere. Therefore, even if the degree of vacuum formed originally is maintained continuously while the liquid surface of the electrolyte 60 is lifted, the amount of gases removed herein is significantly small. As a result, it is possible to solve the problem of electrolyte ejection caused by rapid emission of gases fundamentally.

Meanwhile, according to an embodiment of the present disclosure, the width of the gap space G may be reduced gradually at the same rate. In addition, the width of the gap space G is reduced gradually while increasing the reduction rate gradually. In order to prevent ejection of the electrolyte 60, this is more preferred.

Figure 7:
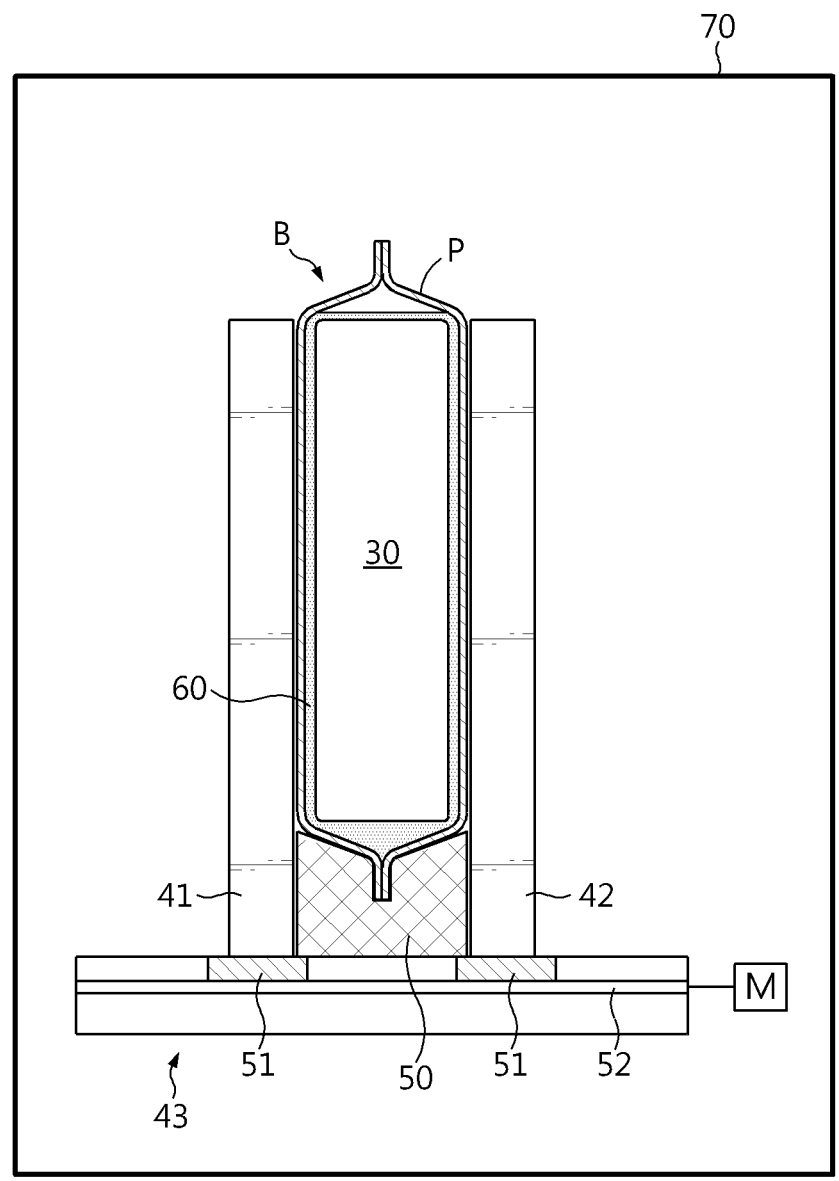
FIG. 7 is a schematic view illustrating the process for sealing an electrolyte inlet after completing the step of removing gases.

When the gases are removed completely from the electrode assembly 30 through the above-mentioned process, the first and the second metal laminate films 10, 20 corresponding to the electrolyte inlet A are sealed as shown in FIG. 7, thereby finishing the electrolyte injection process.

The sealing of the electrolyte inlet A may be carried out after converting the vacuum atmosphere in the vacuum chamber 70 into ambient pressure or may be carried out in the external air after discharging the jig stand 43 to the outside of the vacuum chamber 70.

According to the present disclosure, it is possible to further increase the degree of vacuum in the vacuum chamber 70 during the process for removing gases after injecting an electrolyte 60, as compared to the conventional method. It is also possible to maintain a high degree of vacuum from the initial stage. Most gases are removed while the liquid surface of the electrolyte 60 is lowered. During the gas removal, as the liquid surface of the electrolyte 60 is low, the electrolyte 60 is not dispersed or ejected to the outside of the electrolyte inlet A even when the degree of vacuum is high.

For example, according to the related art, the degree of vacuum of the vacuum chamber 70 was increased gradually through the four steps, considering the ejection of the electrolyte 60: −75 kPa for 5 minutes, −80 kPa for 5 minutes, −85 kPa for 5 minutes, and −93 kPa for 5 minutes.

However, when applying the present disclosure, there is no risk of ejection of the electrolyte 60. Thus, it is possible to set the degree of vacuum to −93 kPa at the initial stage, and thus to reduce the tack time of the process carried out in the vacuum chamber 70 as compared to the conventional process.

Therefore, the method for injecting an electrolyte according to the present disclosure can reduce a tack time and can remove the gases present in the electrode assembly 30 more effectively. As a result, it is possible to reduce defect generation and to improve productivity.

The present disclosure has been described in detail with reference to particular embodiments and drawings. However, it should be understood that the present disclosure is not limited thereto and various changes and modifications within the scope of the disclosure will become apparent to those skilled in the art from this detailed description and the following claims.

INDUSTRIAL APPLICABILITY

According to the present disclosure, it is possible to remove gases from the inside of a pouch casing, while not causing a delay in tack time during a process of injecting an electrolyte to a pouch secondary battery. In addition, it is possible to improve the productivity of the electrolyte injection process by virtue of such a reduced tack time.

What is claimed is:

1. A method for injecting an electrolyte to a pouch secondary battery, which comprises the steps of:
   1) interposing an electrode assembly between a first metal laminate film and a second metal laminate film forming a pouch casing, and sealing edges of each of the films together with an electrolyte inlet left therein, thereby providing a pouch secondary battery;
   2) mounting the pouch secondary battery between a first jig and a second jig of a jig stand to have a controllable interval and form a gap space between the first jig and the second jig, with the electrolyte inlet facing up, and injecting an electrolyte through the electrolyte inlet;
   3) loading the jig stand into a vacuum chamber;
   4) increasing a width of the gap space by moving the first and the second jigs so that an area occupied by the electrolyte may be localized in a lower part of the pouch casing, and then forming a vacuum atmosphere; and
   5) moving the first and jig or the second jigs while maintaining the vacuum atmosphere so that the width of the gap space may be reduced gradually and a liquid surface of the electrolyte may be lifted gradually to a position higher than a top of the electrode assembly, wherein during step 4), the method further comprises spraying gas, using a blower, inside of the pouch casing.

2. The method for injecting an electrolyte to a pouch secondary battery according to claim 1, wherein the liquid surface of the electrolyte is located at a position corresponding to ½ h or less based on a height h of the electrode assembly, in step 4) when increasing the width of the gap space.

3. The method for injecting an electrolyte to a pouch secondary battery according to claim 1, which further comprises a step of sealing the electrolyte inlet.

4. The method for injecting an electrolyte to a pouch secondary battery according to claim 1, wherein a same degree of vacuum is applied to the vacuum atmosphere, in steps 4) and 5).

5. The method for injecting an electrolyte to a pouch secondary battery according to claim 1, wherein a degree of vacuum of the vacuum atmosphere is −93 kPa or less, in steps 4) and 5).

6. The method for injecting an electrolyte to a pouch secondary battery according to claim 1, further comprising, when increasing the width of the gap space in step 4), increasing the width of the gap space so that the first jig and the second jig do not substantially pressurize an outer circumferential surface of the pouch casing.

7. The method for injecting an electrolyte to a pouch secondary battery according to claim 1, wherein the width of the gap space is reduced gradually at a constant rate, in step 5).

8. The method for injecting an electrolyte to a pouch secondary battery according to claim 1, wherein the width of the gap space is reduced gradually in step 5) and the and a reduction rate is increased gradually with time.

9. The method for injecting an electrolyte to a pouch secondary battery according to claim 1, wherein the blower sprays gas toward a side wall of the pouch casing.

10. The method for injecting an electrolyte to a pouch secondary battery according to claim 1, wherein the vacuum atmosphere is formed after spraying gas by using the blower, in step 4) while increasing the width of the gap space.

11. The method of claim 9, wherein the blower comprises a Y-shaped nozzle.

* * * * *